United States Patent
Putt et al.

(10) Patent No.: US 6,780,356 B1
(45) Date of Patent: Aug. 24, 2004

(54) METHOD FOR PRODUCING AN INORGANIC FOAM STRUCTURE FOR USE AS A DURABLE ACOUSTICAL PANEL

(75) Inventors: Dean L. Putt, Lititz, PA (US); John J. Hartman, Jr., Millersville, PA (US); Chester W. Hallett, North East, MD (US); Andrea M. Moser, Millersville, PA (US)

(73) Assignee: AWI Licensing Company, Wilmington, DE (US)

( * ) Notice: Subject to any disclaimer, the term of this patent is extended or adjusted under 35 U.S.C. 154(b) by 93 days.

(21) Appl. No.: 09/662,929

(22) Filed: Sep. 15, 2000

Related U.S. Application Data (60) Provisional application No. 60/179,420, filed on Jan. 31, 2000, provisional application No. 60/179,385, filed on Jan. 31, 2000, provisional application No. 60/179,367, filed on Jan. 31, 2000, provisional application No. 60/157,301, filed on Oct. 1, 1999, and provisional application No. 60/157,269, filed on Oct. 1, 1999.

(51) Int. Cl.[7] ............................. B28B 1/50; B28B 1/52; B28B 5/02; B28B 11/08
(52) U.S. Cl. ...................... 264/42; 264/45.5; 264/45.6; 264/46.2; 264/48; 264/162; 264/284; 264/293; 366/3; 366/4; 366/10
(58) Field of Search ................................. 181/288, 293, 181/286, 294; 264/42, 45.5, 45.6, 46.2, 48, 162, 284, 293; 366/3, 4, 10

(56) References Cited

U.S. PATENT DOCUMENTS

| | | | | |
|---|---|---|---|---|
| 2,189,889 A | * | 2/1940 | Engel | 47/65.7 |
| 3,444,956 A | | 5/1969 | Gaffney | 181/33 |
| 3,542,640 A | | 11/1970 | Friedberg et al. | 162/101 |
| 3,819,388 A | | 6/1974 | Cornwell | 106/86 |
| 3,871,952 A | | 3/1975 | Robertson | 162/101 |
| 3,929,947 A | * | 12/1975 | Schwartz et al. | 264/42 |
| 4,031,285 A | | 6/1977 | Miller et al. | 428/294 |
| 4,042,745 A | | 8/1977 | Cornwell et al. | 428/310 |
| 4,127,751 A | * | 11/1978 | Kinoshita | 181/199 |
| 4,441,944 A | | 4/1984 | Massey | 156/71 |
| 4,488,932 A | | 12/1984 | Eber et al. | 162/9 |
| 4,504,555 A | * | 3/1985 | Prior et al. | 428/689 |
| 4,551,384 A | | 11/1985 | Aston et al. | 428/312.6 |
| 4,613,627 A | | 9/1986 | Sherman et al. | 521/68 |
| 4,636,444 A | | 1/1987 | Lombardozzi | 428/596 |
| 4,676,937 A | * | 6/1987 | Brown et al. | 264/42 |
| 4,702,870 A | | 10/1987 | Setterholm et al. | 264/87 |

(List continued on next page.)

FOREIGN PATENT DOCUMENTS

| | | | |
|---|---|---|---|
| DE | 1 033 123 | 6/1958 | |
| DE | 1 117 467 | 11/1961 | |
| EP | 0 153 588 A1 | 9/1985 | ............. B28B/5/02 |
| EP | 0 592 837 A2 | 4/1994 | ............. C08J/9/30 |
| FR | 2 287 978 | 5/1976 | ............. B28C/5/00 |
| GB | 870937 | 6/1961 | |

OTHER PUBLICATIONS

European Search Report Communication—Application No. EP 00 12 0754.7–2111 dated Oct. 20, 2003.

Primary Examiner—Michael Colaianni
Assistant Examiner—Michael I. Poe (57) ABSTRACT

A process and apparatus for creating an acoustically absorbent porous panel comprises the steps of dispensing cement and fibers with a dry mixer to create a dry mix and aqueous mixing water, surfactant and air with an aqueous mixer to create a foam. The process and apparatus provides for combining and mixing the foam and dry mix in a combining mixer to form a foamed cementitious material comprising on a wet basis about 53% to about 68% by weight cement, about 17% to about 48% by weight water, about 0.05% to about 5% by weight fibers, and about 0.01% to about 10% by weight surfactant. The foamed cementitious material is then dried or cured in a drying chamber. The dried foamed cementitious material may then textured with an embossing roller. The cementitious material provides good acoustical performance with enhanced durability and moisture resistance.

33 Claims, 3 Drawing Sheets

U.S. PATENT DOCUMENTS

| | | | |
|---|---|---|---|
| 4,899,498 A | | 2/1990 | Grieb .......................... 52/144 |
| 4,940,629 A | * | 7/1990 | Weber et al. ............... 428/213 |
| 5,076,985 A | | 12/1991 | Kock et al. .................. 264/119 |
| 5,085,929 A | | 2/1992 | Bruce et al. ............. 428/309.9 |
| 5,160,411 A | | 11/1992 | Bold .......................... 162/398 |
| 5,227,100 A | | 7/1993 | Koslowski et al. ........... 264/26 |
| 5,250,578 A | | 10/1993 | Cornwell ..................... 521/83 |
| 5,277,762 A | | 1/1994 | Felegi, Jr. et al. .......... 162/145 |
| 5,395,438 A | | 3/1995 | Baig et al. .................. 106/214 |
| 5,612,385 A | | 3/1997 | Ceaser et al. ................. 521/68 |
| 5,720,851 A | | 2/1998 | Reiner ........................ 162/101 |
| 5,753,718 A | * | 5/1998 | Jacks ........................... 521/88 |
| 5,824,148 A | | 10/1998 | Cornwell ..................... 106/678 |
| 5,962,107 A | * | 10/1999 | Lowery et al. ............. 428/131 |
| 6,443,258 B1 | * | 9/2002 | Putt et al. .................... 181/294 |
| 6,613,424 B1 | * | 9/2003 | Putt et al. ................ 428/312.4 |
| 2003/0178250 A1 | * | 9/2003 | Putt et al. ................... 181/290 |

* cited by examiner

METHOD FOR PRODUCING AN INORGANIC FOAM STRUCTURE FOR USE AS A DURABLE ACOUSTICAL PANEL

This application claims the benefit of U.S. Provisional Application Nos. 60/157,269, 60/157,301, each filed Oct. 1, 1999; and U.S. Provisional Application Nos. 60/179,367, 60/179,385, and 60/179,420, each filed Jan. 31, 2000.

FIELD OF THE INVENTION

The present invention relates to the field of building materials, and more particularly to a method and apparatus for producing cementitious materials designed for acoustic absorbency. The cement of the foamed cementitious composition may be a hydraulic cement including, but not limited to portland, gypsum, sorrel, slag, fly ash or calcium alumina cement. Additionally, the gypsum may include a calcium sulfate alpha hemihydrate or calcium sulfate beta hemihydrate, natural, synthetic or chemically modified calcium sulfate beta hemihydrate as well as mixtures of the above-referenced cement ingredients.

BACKGROUND OF THE INVENTION

Acoustical panels for walls and ceilings provide sound absorption, aesthetics, and separate utility space in ceilings. Manufacturers strive to develop decorative acoustical wall and ceiling panels at the lowest possible cost by continuously refining the manufacturing process in an effort to reduce energy use, materials costs and waste. While cost reduction is important, there is an inherent limit to how much the process can be simplified and still produce a panel that meets the requirements of acoustical performance, moisture resistance, and fire resistance.

Typical wallboard manufacturing begins with gypsum that is mined and crushed as gypsum rock or obtained synthetically from flu gas desulfurization plants. In the calcination process, the powdered gypsum is heated to dehydrate the gypsum to a hemihydrate. The calcined gypsum or hemihydrate is known as stucco. Fillers such as perlite and fiberglass are added to the stucco to achieve the desired properties of the finished wallboard. Other additives include starch to help adhere the core to the paper face. Retarders and accelerators may be added to adjust the reaction rate. These ingredients are combined with water and soap foam in a high speed or pin mixer. Although soap foam is added to lower the core density, the resulting structure may not have sufficient porosity to be considered acoustic. The resulting mixture is placed between two sheets of paper and sized for thickness by a roller. After the core sets up, the board is cut to length then transferred to an oven to dry.

Current methods of producing acoustical ceiling panels utilize various combinations of fibers, fillers, binders, water and/or surfactants mixed into a slurry that is processed into panels. The process is very similar to the methods used in papermaking. Examples of fibers used may include mineral fiber, fiberglass, and cellulosic material. Mineral wool is a lightweight, vitreous, silica-based material spun into a fibrous structure similar to fiberglass and may also be used. Mineral wool enhances acoustical performance, fire resistance, and sag resistance of an acoustic panel.

Fillers may include expanded perlite and clay. Expanded perlite reduces material density and clay enhances fire resistance of the acoustical panel. Examples of binders used in acoustical panels may include starch, latex and/or reconstituted paper products, which link together and create a binding system that locks all of the ingredients into a structural matrix.

The above ingredients, when combined and processed appropriately, produce a porous, sound absorbent panel suitable for use as acoustic ceiling panels and other types of construction panels. Today, such panels are manufactured using very high volume processes that resemble paper production.

An aqueous cellular foam, that entrains air, forms as a result of the process of combining fibers, fillers and binders. The aqueous cellular foam eventually dries to provide a stable structure within which fiber, binders and fillers may settle and bond to create a matrix. The aqueous cellular foam mixture may include a surfactant to facilitate the entrainment of air into the mixture. The structure of a typical prior art ceiling panel material is shown in the 30× photomicrograph of FIG. 1. The perlite particles are discemable as round nodules embedded in an interconnecting matrix of mineral wool and reconstituted newsprint fibers.

Current processes for manufacturing ceiling panels are complex, include many steps, and use large amounts of water and energy. During the process, water is progressively removed from the product through a combination of draining, pressing, and high-temperature oven heating. Some drained water may be recycled, but a majority is treated and released into the environment.

Different production processes and slurry recipes yield panels with differing acoustical and structural characteristics. There is a tradeoff between the acoustical performance and the durability. A highly porous, low-density material may exhibit the best acoustical performance. Unfortunately, a low-density material tends to be fragile and difficult to handle and exhibits low durability, low scrubability, and low tensile strength. For the purpose of this disclosure, the term durability refers to a panel's compressive yield strength which is a measure of how easily the panel material deforms under compression. Resistance to finger indentation is an example of good compressive yield strength. Scrubability is the resistance to abrasion by repeated back and forth motion of a wet scrub brush. Tensile strength refers to the ability to lift or support a panel along one edge without the panel breaking.

Figure 2:
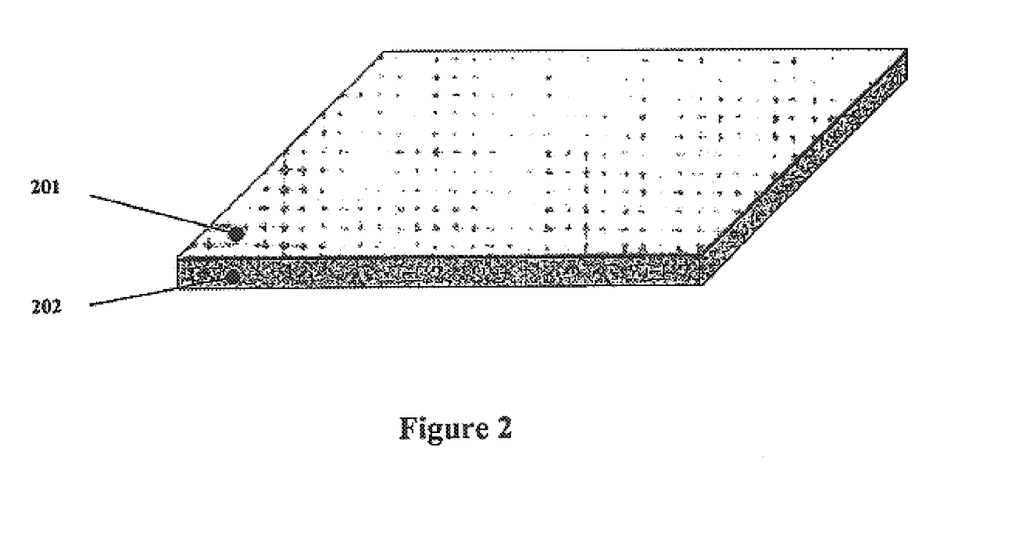
FIG. 2 is a schematic, perspective representation of a laminate-based acoustic panel made in accordance with the prior art.

Various processes and recipes are used to balance the tradeoffs inherent in the manufacture of acoustical ceiling panels. For example, one common structure for a ceiling panel is a laminate, using different layers of material, as shown in FIG. 2. One layer 201 comprises a soft, acoustically absorbent material, while the other layer 202, which faces into the room, is a more durable, sometimes structural material that is relatively transparent to sound. The acoustical performance of the panel is largely a function of layer 201, while layer 202 enhances the durability, scrubability, and aesthetics. The outer layer 202 in FIG. 2 may be a third-party supplied material. Normally, an adhesive attaches overlay 202 to layer 201. Other steps involved in the manufacture of such laminated panels include painting, cutting to size, and packaging.

Laminated panels provide a good balance between performance and durability. Such panels have the advantage of being susceptible to continuous manufacturing processing in certain steps, but require additional process steps and additional materials, e.g. the outer layer material and adhesive, which are not required when producing a homogeneous panel. Furthermore, the outer layer material usually is a high-cost constituent and the lamination process requires additional machinery, materials, and human resources. While the production of the acoustical material 201 component can typically be done in continuous fashion, the lamination step is not a continuous process. As a result, laminated panels are relatively expensive to manufacture.

Figure 1:
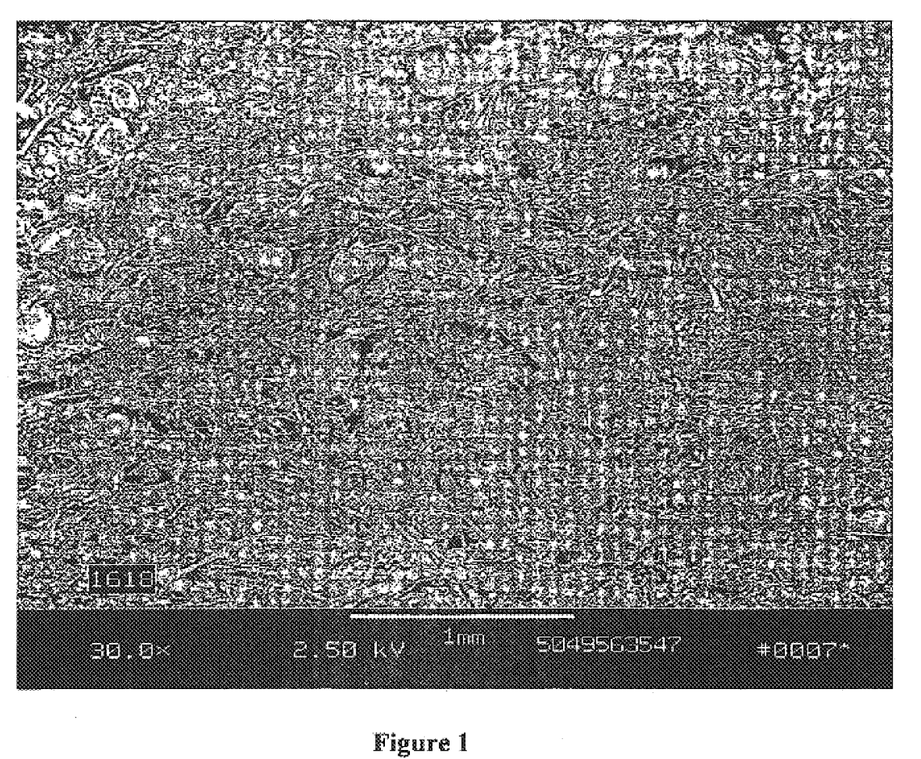
FIG. 1 is 30× photomicrograph of a mineral wool-based material made in accordance with the prior art.

Casting or molding processes are also used to create a panel structure as in FIG. 1. Casting produces a homogeneous material that is very durable and has good acoustical properties. Cast materials generally have a much higher density, and do not require an additional layer present in laminated construction. Casting is essentially a batch process in which the material is poured into a mold. The bottom of the mold is typically lined with a carrier or release agent to prevent sticking. The materials are dried in the mold, the mold is removed, and the panel undergoes a finishing process. Molded panels usually have good mechanical strength properties and exhibit good durability with acoustical performance generally not as good as a laminated panel. Drawbacks to the molding process include: the requirement of moving molds continuously throughout the process, smaller panels resulting from mold size constraints; the requirement of the added step of panel removal from the molds; and higher material cost per panel because of increased panel density.

Another common method of producing a panel having the structure shown in FIG. 1 is to extrude slurry onto a wire belt, and allow the water to drain and/or drive the water from the slurry. Other process steps include forming, drying, and surfacing or sanding resulting panels to create the desired texture in a nearly continuous process to produce an acoustically absorbent layer. Other process steps such as embossing or punching small holes into the material may further enhance the acoustical absorbency of the panel. Disadvantages include high energy costs for drying and the treating of discharge water.

With the foregoing problems in mind, there is a need to produce a low-density material for use in ceiling and other structural panels having good acoustical performance, while maintaining structural durability of the material.

Additionally, there is a need to produce a panel with high sag resistance, improved durability, a high Noise Reduction Coefficient (NRC) and a high Sound Transmission Coefficient (STC).

Furthermore there is a need to create a panel that does not require additional additives to enhance fire resistance and to create a non-homogeneous panel with a hard, high-density surface on at least one side.

SUMMARY OF THE INVENTION

The present invention provides for a process for creating an acoustically absorbent porous panel comprising the steps of dispensing dry cementitious material, dispensing fibers to create a dry mix and aqueous mixing water, surfactant and air to create a foam. Then the process provides for combining and mixing the foam and dry mix to form a foamed cementitious material comprising on a wet basis about 53% to about 68% by weight cement, about 17% to about 48% by weight water, about 0.05% to about 5% by weight fibers, and about 0.01% to about 10% by weight surfactant The foamed cementitious material is then dried or cured.

Additionally, the process provides for creating acoustical ceiling panels comprising the steps of dry mixing cement, calcium silicate and fibers in a dry mixer to create a dry mix and aqueous mixing water and surfactant in an aqueous mixer to create a diluted surfactant solution. Then combining and mixing the diluted surfactant solution, air and dry mix in a combining mixer to create a foamed cementitious material. The foamed cementitious material is then dried in a drying chamber to form an absorbent porous panel having a density between about 10 and 40 $lb/ft^3$, a Hess rake finger scratch test result of at least 12, a Noise Reduction Coefficient of at least 0.5, and a sag test result of less than 0.15 inches at 90% RH.

Furthermore the process provides for creating acoustical ceiling panels comprising the steps of dry mixing cement and synthetic organic fibers to create a dry mix and aqueous mixing water and surfactant to create a diluted surfactant solution. Then combining and mixing the foam and dry mix to form a foamed cementitious material comprising on a wet basis about 56% to about 61% by weight cement, about 32% to about 42% by weight water, about 0.28% to about 1.3% by weight fibers, and about 0.7% to about 2% by weight surfactant. The foamed cementitious material is then dried.

The described process also includes removing the high-density skin layer from one side of a foamed cementitious panel to expose the low-density matrix for acoustical purposes. Additionally, the process may create an acoustical panel with enhanced fire resistance.

Furthermore the apparatus provides means for creating acoustical panels comprising a dispenser to convey cementitious material an aqueous mixer for aqueous mixing water and surfactant to create a diluted surfactant solution, a combining mixer for combining and mixing the foam and dry mix to form a foamed cementitious material and a dispenser to convey fibrous material. The fibrous material may be combined with the foam and cementitious material after exiting the combining mixer. In one embodiment the foamed cementitious material comprising on a wet basis about 56% to about 61% by weight cementitious material, about 32% to about 42% by weight water, about 0.28% to about 1.3% by weight fibers, and about 0.7% to about 2% by weight surfactant. The foamed cementitious material is then dried in a drying chamber.

The described apparatus also includes a sander for removing the high-density skin layer from one side of a foamed cementitious panel to expose a low-density matrix for acoustical purposes. Additionally, the apparatus may create an acoustical panel with enhanced fire resistance.

These and other features and aspects of the present invention will become apparent upon reading the following specification, when taken in conjunction with the accompanying drawings.

DETAILED DESCRIPTION OF THE INVENTION

Figure 3:
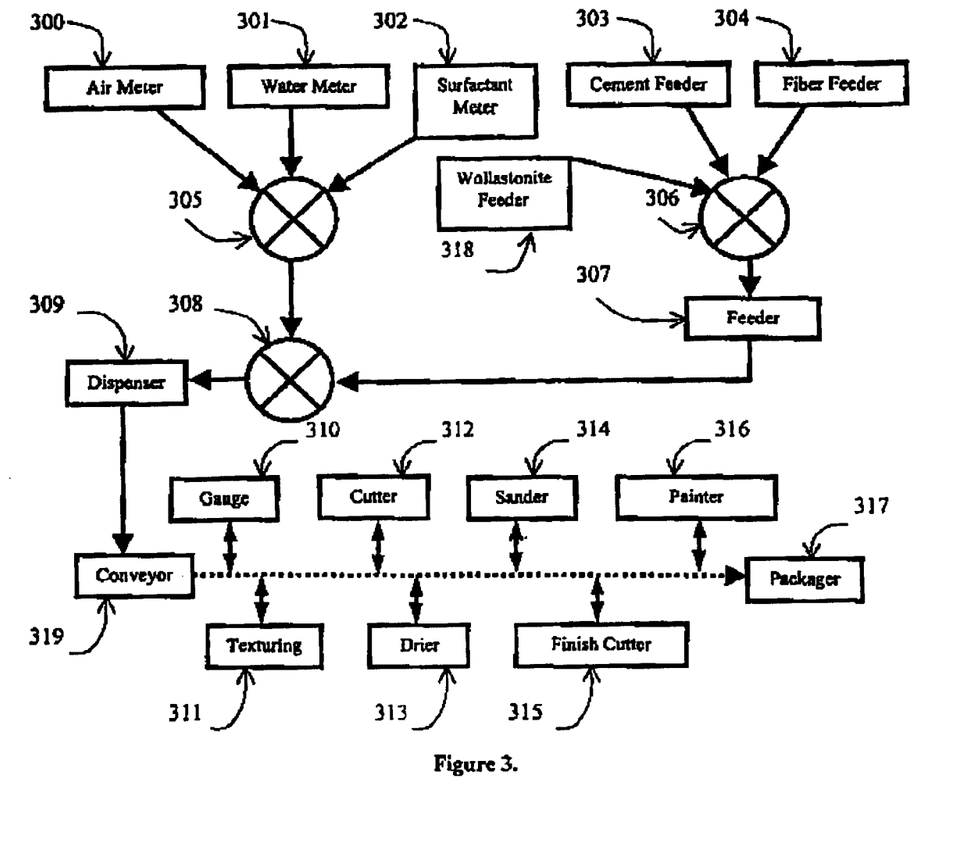
FIG. 3 is a schematic representation of a process for producing an inorganic cementitious foam structure for use as a durable acoustical panel.

The present invention comprises a method and apparatus for producing a foamed cementitious material having acoustical, good compression strength, excellent surface durability (such as scratch resistance), and dimensional stability under humid conditions (such as sag resistance) as illustrated in FIG. 3. The method broadly comprises the steps of dispensing dry ingredients, aqueous mixing liquid and gaseous ingredients, combining the dry and aqueous mix, dispensing, texturing, cutting, drying, sanding, finish cutting and sealing. The apparatus broadly comprises a dry nixer, aqueous mixer, combining mixer, dispenser, embosser, cutter, drying chamber, sander, finish cutter and spray chamber.

Essentially, the process begins with dispensing dry fibers and cement. Optionally the dry fibers and cement may be combined to create a dry mix. Water, surfactant and air are mixed to create a foam which is combined and mixed with the dry ingredients or dry mix to form a foamed cementitious material. The mixed foamed cementitious material on a wet basis can comprise about 53% to about 68% by weight cement, about 17% to about 48% by weight water, about 0.05% to about 5% weight fibers, and about 0.01% to about 10% weight surfactant.

The apparatus for continuously producing the porous inorganic material comprises a station for proportioning and dry mixing cementitious material, such as, fibers and other aggregates if necessary; a station for proportioning wet ingredients, including water, air and surfactant; a station for combining the wet and dry mixtures into an aqueous foam material; a station for gauging a thickness of the dispensed material; a station for texturing the material; a station cutting a width of the material; a station for sanding the material; a station for finish cutting the material into individual panels; a station for sealing and painting the panels; and a station for packaging the panels.

Essentially, the apparatus begins with a dry mixer for dry mixing fibers and cement to create a dry mix, and aqueous mixing water surfactant and air to create a foam which is combined and mixed with the dry mix to form a foamed cementitious material. The mixed foamed cementitious material on a wet basis can comprise about 53% to about 68% by weight cementitious material, about 17% to about 48% by weight water, about 0.05% to about 5% weight fibers, and about 0.01% to about 10% weight surfactant.

Other formulations for the mixed, foamed cementitious material on a wet weight percentage may include about 54% to about 61% cement; about 32% to about 44% water; about 0.1 to about 3% fibers; and about 0.5% to about 5% surfactant. Additionally, the foamed cementitious material in uncured, wet weight percentages may include about 56% to about 61% cement; about 32% to about 42% water; about 0.28% to about 1.3% fibers; and about 0.7% to about 2% surfactant.

Once the foamed cementitious material is produced it may then be dispensed onto a conveyer so that the process may be a continuous one. The foamed cementitious material may then be gauged to a desired thickness with a width determined by side-dams restraining the material on the conveyer. A texture may also be added to the foamed cementitious material by an embossing process to add a decorative or acoustically functional pattern to the surface of the material. The foamed cementitious material can then be cut to a desired length determined by the application of the resulting acoustically absorbent panel.

The cut foamed cementitious material is then dried to a moisture content of about 5% or less or about to the point where the surface of the cut foamed cementitious material or panel can be sanded. Once dried, the panels typically have a density between about 10 lbs/ft$^3$ and about 40 lbs/ft$^3$. In an alternative embodiment the panel can have a density between about 15 lbs/ft$^3$ and about 35 lbs/ft$^3$ or between about 20 lbs/ft$^3$ and about 30 lbs/ft$^3$.

Additionally, a hard dense skin layer is formed on the outer surfaces of the formed panel comprising less than about 1% to about 2% of the total thickness of the formed panel. This dense layer is removed from one side of the panel to increase the acoustical absorbency of the panel and is usually removed by sanding.

After sanding, the panels can undergo a finish cutting and the application of an organic coating or sealant. The applied coating adds both to the aesthetics of the panel and to its surface integrity.

Acoustical absorption is a function of sound energy that is both reflected in part and absorbed in part. By removing the dense layer the inner matrix of pores formed within the panel become exposed whereby acoustic energy can be transmitted through the panels or converted into heat by the panel material. The amount of sound energy absorbed by a material is determined by a standardized test procedure ASTM C423-90a entitled "Standard Test Method for Sound Absorption and Sound Absorption Coefficients by he Reverberation Room Method". Absorption is expressed as the ratio of the sound energy absorbed to the sound energy incident to the panel surface. Sound absorption data is often combined into a single number called the Noise Reduction Coefficient which is obtained from the average value of A at 250, 500, 1000 and 2000 Hz rounded to the nearest multiple of 0.05. The higher the NRC value, the greater the average sound absorption in this frequency range. The present acoustically absorbent porous panels typically have Noise Reduction Coefficient of greater than 0.5. In an additional embodiment, the panels have a NRC of greater than 0.6 and in a further embodiment the panels have a NRC of greater than 0.7. Tests having STC results are determined by an insertion loss as set forth in ASTM E 90.

Surface integrity is typically measured as a function of the hardness and is often measured using a scratch resistance test using a scaled score of 10 to 25, wherein the larger figure indicates a more scratch resistance. In the present invention the panels have a scratch resistance test value of about 12 or greater. When the surface of the panel is coated with an organic coating, such as paint, the value is typically at least 16 and can be as great as at least 22 when two coats of paint are applied to the panel. Typically, the panels average between about 12 and 14 for the uncoated panel and between about 16 to 18 for a panel with a single coat of paint.

SCRATCH RESISTANCE TEST

The test consists of "raking" various thicknesses of "feeler" gauge (spring steel) stock across the face or edge of a ceiling tile or panel. The measure is the highest "feeler" gauge thickness (in thousandths of an inch) that does not damage the test material. The metal tongues or fingers are securely arranged evenly in a row and each has a protruding length of approximately 1.875 inches. The thickness of the tongues increase from one end of the row to the other end. The tongue thicknesses are 10, 12, 14, 16, 18, 20, 22, and 25 mils with corresponding increase in stiffness. The sample is placed in a holder below the set of tongues with the sample flange lower than the cutout forming the flange. The tongues are allowed to overlap across the top edge of the sample with the bottom of the tongue a distance of approximately $7/32$ inches below the surface of the sample in the cutout fonming the flange. The tongues are then drawn across the sample at a speed of 20 inches per minute. The thicker tongues will cause a scratch more easily and damage the edge more easily than the thinner tongues.

Additionally, hardness can be determined as a function of compression resistance as set forth in ASTM C 367. The test was modified by the use of a 1-inch ball, 30-lbs force and a cross head speed of ½ inch/min. In the present invention the panels typically have a compression resistance of less than 0.12 inches. In an alternative embodiment the compression resistance can be less than 0.1 inches and in a second embodiment the compression resistance can be less than 0.08 inches.

The formed acoustically absorbent cementitious porous panels are also relatively resistant to moisture. This can be quantified as a value determined from a sag test. The following are approximate four-cycle sag test ranges for various embodiments. Each cycle consists of subjecting the 2 ft by 2 ft sample to 17 hours at 82° F. and 90% RH followed by 6 hours at 82° F. and 35% RH. In one embodiment, at 90% RH there is typically a resulting sag of less than 0.15 inches. In a second embodiment, at 90% RH there is typically a resulting sag of less than 0.1 inches. In a third embodiment, at 90% RH there is typically a resulting sag of less than 0.05 inches.

The cement of the foamed cementitious composition may be a hydraulic cement including, but not limited to, portland, sorrel, slag, fly ash or calcium alumina cement. Additionally, the cement may include a calcium sulfate alpha hemihydrate or calcium sulfate beta hemihydrate, natural, synthetic or chemically modified calcium sulfate beta hemihydrate, as well as mixtures of the above-referenced cement ingredients. For example, the invention may comprise a mixture of calcium alumina cement and portland cement to give a faster set time.

The foamed cementitious composition may also include additives that contribute to the overall hardness of the foamed cement. Such a degree of cement hardness is desired to improve durability and resistance to indention and impact damage. Additives that may contribute to the overall hardness of portland cement generally contain calcium and/or silica compounds. Examples of calcium-based hardeners include calcium oxide, calcium hydroxide and carbonates. Silica additives may include sodium silicate, mica, finely ground sand, and certain ashes high in silica content such as, rice hull ash and fly ash. In the preferred embodiment, an additive to improve strength and maintain foam density is calcium silicate. A fibrous grade of calcium silicate known as wollastonite or Orleans One is utilized in the preferred embodiment.

The foam cementitious composition may also include inorganic fiber materials, such as fiberglass and mineral wool. In an embodiment, the foamed cementitious composition includes polyester fibers of about 0.25 to 0.75 inches long, with the preferred length of about 0.5 inches, and having a diameter of about 0.0005 to 0.007 inches. Longer fibers tend to clump more readily in the mixing steps, and shorter fibers tend to reduce tensile strength.

The present invention may also include a surfactant for the purpose of creating foam during the mixing process. The foaming effect within the cement is important because it allows the creation of an open cell structure within the mixture to improve acoustic absorption performance of the cement. The surfactants may include amphoteric, anionic, and nonionic moieties with a hydrophobic molecular portion containing 8 to 20 carbons. A surfactant for an embodiment is disodium laureth sulfosuccinate because it most effectively suspends particles of cement during the hydration process. For the purpose of foaming calcium sulfate alpha hemihydrate, an ethoxylated alkyl phenol surfactant with a hydrophobic molecular portion containing 8 to 13 carbons, produces optimal particle suspension properties for gypsum.

Maximum foaming of cementitious compositions occurs when the surfactant solution is prepared between about 68 degrees Fahrenheit and about 100 degrees Fahrenheit. In an embodiment, the surfactant solution is prepared at approximately 90 degrees Fahrenheit. This achieves a maximum foaming of the cementitious composition. Applicants have also determined that a deviation in water temperature from the optimum temperature range will increase the density of the foam by a factor of 5 pounds per cubic foot for every 10 degrees Fahrenheit deviation. Thus, it is advantageous to keep the surfactant water solution temperature at approximately 90 degrees Fahrenheit.

It may be possible to create a different process or use different apparatus to approximate the disclosed article of manufacture using a molding or overlay process whereby the mixture is poured onto or around a substrate that provides structural support until the mixture cures. The substrate material might then be removed by heating or solvent action, leaving a network of pores behind.

In the aqueous mixing and foaming step, it may be possible to combine the separate steps of high speed and low speed mixing into a single step for greater efficiency.

Another way of manufacturing similar materials includes utilizing different families of fibers, such as wood fibers, with the same process steps. However, this yields different material characteristics.

Another means of creating the foaming action in the disclosed method would be the use of a different surfactant. Polyvinyl alcohol is a known surfactant that has been used in similar applications. However, disodium laureth sulfosuccinate is a preferred surfactant.

Another way of entraining a gas into the aqueous mixture could utilize chemical means instead of the disclosed mechanical means.

Another embodiment might utilize beta gypsum as an alternative to portland cement or alpha gypsum. Additional process steps, such as adding a wax, may also be necessary to enhance the water tolerance of beta gypsum.

It is possible to expose the inner, porous structure of the material to impinging sound waves by punching holes through the dense skin layer, rather than sanding the board surface to remove the skin layer.

The described process does not require the incorporation of aggregate which is commonly used in other processes. Without aggregate the panels can be cut by conventional tools in the field. Additionally, the present process is continuous and the finished material can be lighter in color than that produced by other processes, thus requiring less paint.

The step of texturing enhances the acoustical performance of the panels. Ridges, holes or other elements that sculpt the surface of the panel will affect its acoustical performance as well as the board aesthetics. The texturing apparatus of the present invention creates less waste material and a better surface finish than prior art methods. Additionally, surface texturing, may occur while the material is still wet. The texturing method of the present invention creates less waste material and a better surface finish than traditional grinding or routing methods.

The method and apparatus for producing the acoustically absorbent cementitious porous panels is further illustrated in greater detail below:

Dry Mixing

An initial step in an embodiment of the process involves dispensing the following ingredients: (1) cement, (typically portland cement), (2) polyester fibers; (typically polyethylene terephthalate (PET), having nominal lengths of about 0.5-inch (±0.25") and having nominal diameters of about 0.0005 inch to about 0.007 inch diameter fiber; and (3) calcium silicate, (typically wollastonite, or Orleans One). Referring to FIG. 3, these dry ingredients can be fed separately or combined in a mixing apparatus 306, respectively, by: (1) cement feeder 303, wherein an amount of cement is weighed and fed for mixing; (2) a fiber feeder 304, wherein an amount of polyester fiber is weighed and fed for mixing; and (3) a calcium silicate feeder 318, wherein an amount of wollastonite is weighted and fed for mixing.

The cement feeder 303, the fiber feeder 304, and the wollastonite feeder 318 are connected to a tumble mixer 306, wherein the dry ingredients are dispersed evenly in a dry mixture. The tumble mixer 306 is connected to a dry feeder 307, herein an amount of material is weighed for further processing.

The dry mixing step can be carried out by other means capable of distributing the fibers in a fairly uniform fashion throughout the dry mix. Such method can include various mechanical methods such as agitators, blowers, mixers, or by vibration. A uniform distribution of the added fibers increases the strength of the formed panel by interlocking the matrix.

Aqueous Mixing

A further step involves mixing the following liquid and gaseous components: (1) water; (2) surfactant; and (3) air. Referring to FIG. 3, each is preferably metered, respectively by: (1) a control valve 301 on the water supply, wherein the desired amount of water is metered for mixing; (2) a control valve 302 on the surfactant supply, wherein the desired amount of surfactant is metered for mixing; and (3) control valve 300 on the air supply, wherein the desired amount of air is metered for mixing. The specific amounts of water, air, and surfactant, are fed to a mixing apparatus 305, wherein the mixing apparatus 305 thoroughly mixes the water and surfactant, and entrains air into the mixture to create an aqueous foam. The output of the foamer 305, is fed to the mixing apparatus. Additionally, the aqueous components are typically mixed and aerated or foamed at temperatures between about 41° F. to about 168° F. In an alternative embodiment the diluted surfactant solution can be mixed at temperatures between about 58° F. to about 142° F. or between about 68° F. to about 92° F. One such method of achieving such temperatures is to determine the temperature to such a range prior to mixing or the mix can be set to such a range.

Dry and Aqueous Mixing

The dry mixture and the aqueous foam stream are combined in a mixing system comprising a continuous mixer 308, wherein the dry components are further dispersed and mixed with the aqueous foam, resulting in a wet mixture with component ingredients in the following proportions, by weight:

1. cementitious material—about 53 to about 68%
2. Water—about 17 to about 48%
3. An optional inorganic fiber such as wollastonite—about 1 to about 10%, about 1% in the preferred embodiment
4. Polyester fibers—about 0.05 to about 5%, about 1% in the preferred embodiment
5. Surfactant—about 0.01 to about 10%, about 1% in the preferred embodiment In this mixing stage, it has been noted that the surfactant facilitates the suspension and three-dimensional orientation of the fibers throughout the mixture. In addition, it has been found that an approximate 0.5 inch fiber length also facilitates the distribution of the fibers throughout the mixture. Mixing vessels adapted to combined cement material with liquids and/or foams, such as those found in the cement production and distribution industries, are suitable for use in this step of the apparatus.

Dispensing

The foamed cementitious mixture then undergoes a dispensing operation at station 309 that moves the wet material onto a moving conveyor comprising 319: (1) a moving conveyor belt, wherein the output of the mixer is located in close proximity to the flexible moving belt supported from below such that the material is dispensed onto the moving belt; and (2) a side dam, or deckle, wherein a fixed vertical surface is in contact with the edges of the material as it moves on the belt, such that it is confined to a constant overall width. The side dam may be attached to the conveyor or may be stationary with respect to the conveyor. Alternatively, a deckle ejecting a high-velocity stream of water may also serve as a cutting or width-fixing means for the extruded foam.

Gauging

The material dispensed onto the moving conveyor and is constrained in thickness by: (1) a gauging roller 310, wherein the material passes under a cylindrical roller that limits the thickness of the material. This process step can yield a preferable product thickness of about 0.25 inches to about 1.0 inches. The gauging apparatus should be next to and separated a predetermined distance from a texturing station, as is explained below.

Texturing

In this step, the material is subjected to a surface treatment by an embossing process, such as by an embossing roller 311. More specifically, the conveyor belt carries the material under a rotating cylindrical embossing roller, which impresses a decorative and/or acoustically functional pattern onto the surface of the material.

Gauging roller 310, embossing roller 311 and cutter 312 are generally separated by predetermined distances based on the cure rate of the gypsum or other cement used in the product. For example, in some cases, it may be desirable to allow for partial curing of the foam surface prior to embossing at station 311, in order to allow for a clear imprint of the embossing pattern or to effectively remove or puncture an outer skin of the material to enhance acoustic absorbability of one side of the material. If the cure time is known, then the distance is determined by multiplying the conveyor speed by the cure time.

Cutting

In this step, the material is divided perpendicular to the direction of movement of the belt at regular intervals by a cutter apparatus 312. More specifically, the belt carries the material decorated under a cutting apparatus which cuts the material perpendicular to the travel of the conveyor belt at fixed intervals. The cutting mechanism may comprise any number of embodiments, including but not limited to a vertically reciprocating knife, a fly cutter or a water jet ejecting a high-velocity stream of water at regular intervals. The time length between sprays and the conveyor velocity will determine the length of material between cuts.

There is a fixed period of time between the steps of texturing and cutting during which the material partially cures. This time period is set by the speed of the conveyor 319 as it moves material continuously beginning with the step of dispensing. Thus, the distance between embossing roller 311 and cutter 312 is determined by multiplying the cure time by the conveyor speed.

Drying

In this step, the conveyor carries the material into a drying chamber 313, and exposes the material to a nominal temperature of about 200° F. The drying step drives off excess water that is not bound in the crystalline structure of the material.

Sanding

In this step, the conveyor 319 moves the dried material beneath a sanding drum 314, wherein the belt carrying the dried material passes under a rapidly spinning cylindrical drum covered with a sanding medium. This step removes the hard skin that develops during the curing and drying processes. Also, the sanding step may be omitted if the particular embossing is for decorative purposes. Optionally, if texturing is performed, a grit blaster may be used to provide a depth of the embossing or to impart a particular image into the surface of the product. The depth of the sanding will be less than the depth of the embossing. A vacuum port with a wide vacuum nozzle is placed in close proximity to the sanding drum and the surface of the product to remove waste material.

Finish Cutting

The conveyor 319 moves the sanded boards to finish cutting 315 which includes (1) a side cutting apparatus, wherein the dried board is moved from the sanding to an apparatus that trims the board to a finished size and profile along two edges; and (2) an end cutting apparatus, wherein the dried board is moved from the first finish cutting operation to another apparatus for further trimming to the finished size and profile along the remaining two edges. The cutting apparatus may also be fitted to provide for a specific desired edge detail.

Sealing and Painting

The treated boards are moved by conveyor into a paint spraying apparatus 316, wherein the finish-cut board travels along a belt to a spraying booth where aerosol paint is applied to the top surface of the material to obtain a desired color.

Packaging

The finished boards are labeled, shrink-wrapped and boxed for warehousing and distribution at packager 317.

While embodiments have been illustrated and described above, it is recognized that variations may be made with respect to features and components of the invention. Therefore, while the invention has been disclosed in preferred forms only, it will be obvious to those skilled in the art that many additions, deletions and modifications can be made therein without departing from the spirit and scope of this invention, and that no undue limits should be imposed thereon except as set forth in the following claims. For example the type of cement utilized within the formula may vary depending upon desired properties of the material. Additionally, the type, length and denier of fiber may vary depending upon strength requirements of the end product to be constructed from the panel.

What is claimed is:

1. A process for creating acoustical ceiling panels comprising the steps of:

dry mixing cement and synthetic organic fibers to create a dry mix;

aqueous mixing water and surfactant to create a diluted surfactant solution;

combining and mixing the diluted surfactant solution and dry mix to form a foamed cementitious material comprising on a wet basis about 56% to about 61% by weight cement, about 32% to about 42% by weight water, about 0.28% to about 1.3% by weight fibers, and about 0.7% to about 2% by weight surfactant; and drying the foamed cementitious material.

2. A process for creating acoustical ceiling panels comprising the steps of:

dry mixing cement, and fibers to create a dry mix;

aqueous mixing water and surfactant to create a diluted surfactant solution;

combining and mixing the diluted surfactant solution, air and dry mix to create a foamed cementitious material; and drying the foamed cementitious material to form an absorbent porous panel having a density between about 10 and 40 lb/ft$^3$, a Hess rake finger scratch test result of at least 12, a Noise Reduction Coefficient of at least 0.5, and a sag test result of less than 0.15 inches at 90% RH.

3. The process of claim 2, wherein the cement is gypsum.

4. The process of claim 2, further including adding calcium silicate to the dry mix.

5. The process of claim 2, wherein the fibers are polyester fibers.

6. A process for creating an acoustically absorbent porous panel comprising the steps of:

dispensing and conveying dry cement dispensing and conveying dry fibrous material aqueous mixing water, surfactant and air to create a foam;

combining and mixing the foam and dry ingredients to form a foamed cementitious material comprising on a wet basis about 53% to about 68% by weight cement, about 17% to about 48% by weight water, about 0.05% to about 5% by weight fibers, and about 0.01% to about 10% by weight surfactant; and drying the foamed cementitious material.

7. The process of claim 6, wherein the process includes dry mixing cement and fibers to create a dry mix.

8. The process of claim 6, further including texturing the foamed cementitious material.

9. The process of claim 6, further including cutting the panel.

10. The process of claim 6, wherein the foamed cementitious material is dried to at least 5% or less moisture.

11. The process of claim 6, wherein the dried foamed cementitious material has a density between 10 lbs/ft$^3$ and about 40 lbs/ft$^3$.

12. The process of claim 6, wherein the panel is an acoustic ceiling tile.

13. The process of claim 6, wherein the range for a Sound Transmission Coefficient is between about 30 to about 40.

14. The process of claim 6, wherein the cement is selected from the group consisting of portland, gypsum, sorrel, slag, fly ash, and calcium alumina cement.

15. The process of claim 6, further including regulating the temperature of the aqueous mixture to a temperature between about 41° F. to about 168° F.

16. The process of claim 15, wherein the aqueous mixture is regulated to a temperature of between about 68° F. to about 100° F.

17. The process of claim 6, further including adding calcium silicate to the dry mix.

18. The process of claim 17, wherein the calcium silicate comprises about 1% to about 10% by weight of the foamed cementitious material.

19. The process of claim 6, wherein a Noise Reduction Coefficient of the panel is at least 0.5.

20. The process of claim 19, wherein the Noise Reduction Coefficient of the panel is at least 0.7.

21. The process of claim 6, further including forming pores within the foamed cementitious material.

22. The process of claim 21, wherein the pores are open to other pores creating pathways through the cementitious material whereby sound can be effectively absorbed.

23. The process of claim 21, wherein the diameter of the pores is between about 1.5 mm and about 40 µm.

24. The process of claim 23, wherein the pores have an average diameter from about 50 µm to about 200 µm.

25. The process of claim 6, further including forming a dense skin on both a facing side and backing side of the panel wherein the dense skin comprises less than about 2% of the total thickness of the panel.

26. The process of claim 25, wherein the skin is between about 125 µm to about 250 µm thick.

27. The process of claim 25, further including the step of applying an organic coating to the facing side of the panel.

28. The process of claim 25, further including the step of removing the dense skin of the facing side of the panel.

29. The process of claim 28, wherein the step of removing the dense skin of the facing side includes sanding.

30. The process of claim 6, wherein the process is continuous and uses a conveyor.

31. The process of claim 30, further including dispensing the foamed cementitious material onto the conveyor.

32. The process of claim 31, further including gauging the thickness of the foamed cementitious material.

33. The process of claim 32, wherein the thickness of the foamed cementitious material is gauged to least 0.25 inches.

* * * * *